(12) United States Patent
Bauer et al.

(10) Patent No.: US 8,069,974 B2
(45) Date of Patent: Dec. 6, 2011

(54) TRANSPORT DEVICE WITH A MONITORING APPLIANCE AND SUBSTRATE TREATMENT APPARATUS

(75) Inventors: Reinhardt Bauer, Dresden (DE); Johannes Struempfel, Dresden (DE); Andreas Heisig, Dresden (DE); Matthias Smolke, Leipzig (DE); Thomas Posseckardt, Karsdorf (DE); Frank Hupka, Pirna (DE)

(73) Assignee: Von Ardenne Anlagentechnik GmbH, Dresden (DE)

( * ) Notice: Subject to any disclaimer, the term of this patent is extended or adjusted under 35 U.S.C. 154(b) by 476 days.

(21) Appl. No.: 12/169,966

(22) Filed: Jul. 9, 2008

(65) Prior Publication Data

US 2009/0014285 A1    Jan. 15, 2009

(30) Foreign Application Priority Data

Jul. 9, 2007   (DE) .................. 10 2007 032 009

(51) Int. Cl.
*B65G 43/00* (2006.01)
(52) U.S. Cl. .................................................. 198/810.01
(58) Field of Classification Search ............. 198/810.01, 198/502.1, 502.4; 474/90; 193/35 R; 361/220–222
See application file for complete search history.

(56) References Cited

U.S. PATENT DOCUMENTS

| | | | | |
|---|---|---|---|---|
| 2,349,437 A * | 5/1944 | Keeler | ........................... | 324/100 |
| 2,472,526 A | 6/1949 | Frazee | | |
| RE25,215 E * | 8/1962 | James | ........................ | 198/502.4 |
| 3,161,479 A * | 12/1964 | Biderman | ........................ | 34/245 |
| 3,365,165 A | 1/1968 | Gire | | |
| 3,828,250 A * | 8/1974 | Buser et al. | ...................... | 324/72 |
| 3,937,542 A * | 2/1976 | Amundsen, Jr. | ................ | 439/16 |
| 3,944,354 A * | 3/1976 | Benwood et al. | ................ | 399/73 |
| 4,244,465 A * | 1/1981 | Hishikawa et al. | ........... | 198/691 |
| 4,626,699 A * | 12/1986 | Oesterle et al. | ............... | 307/106 |
| 4,716,997 A * | 1/1988 | Gibson | ........................... | 191/63 |
| 4,944,385 A * | 7/1990 | Shelby | .......................... | 198/495 |
| 5,585,730 A * | 12/1996 | Pazda et al. | ................... | 324/452 |
| 6,530,694 B2 * | 3/2003 | Takemura | ..................... | 384/476 |

FOREIGN PATENT DOCUMENTS

| | | |
|---|---|---|
| AT | 500851 A4 | 4/2006 |
| DE | 102004005965 A1 | 9/2005 |

\* cited by examiner

*Primary Examiner* — Gene Crawford
*Assistant Examiner* — William R Harp
(74) *Attorney, Agent, or Firm* — Heslin Rothenberg Farley & Mesiti P.C.

(57) ABSTRACT

In a transport device, which comprises at least one endless conveyor guided around at least two guide rollers, a monitoring appliance for monitoring motion of a guide roller is positioned on at least one of the guide rollers. The monitoring appliance comprises a first contact element disposed on and electrically connected with the guide roller, and a second contact element disposed near the guide roller. The first and second contact elements are arranged relative to one another in such a way that an electrical contact between them occurs with every revolution of the guide roller, such that the electric potential of the guide roller is transmitted to the second contact element. Additionally, a substrate treatment apparatus comprising such transport device is disclosed.

11 Claims, 2 Drawing Sheets

TRANSPORT DEVICE WITH A MONITORING APPLIANCE AND SUBSTRATE TREATMENT APPARATUS

CROSS REFERENCE TO RELATED APPLICATIONS

Figure 1:
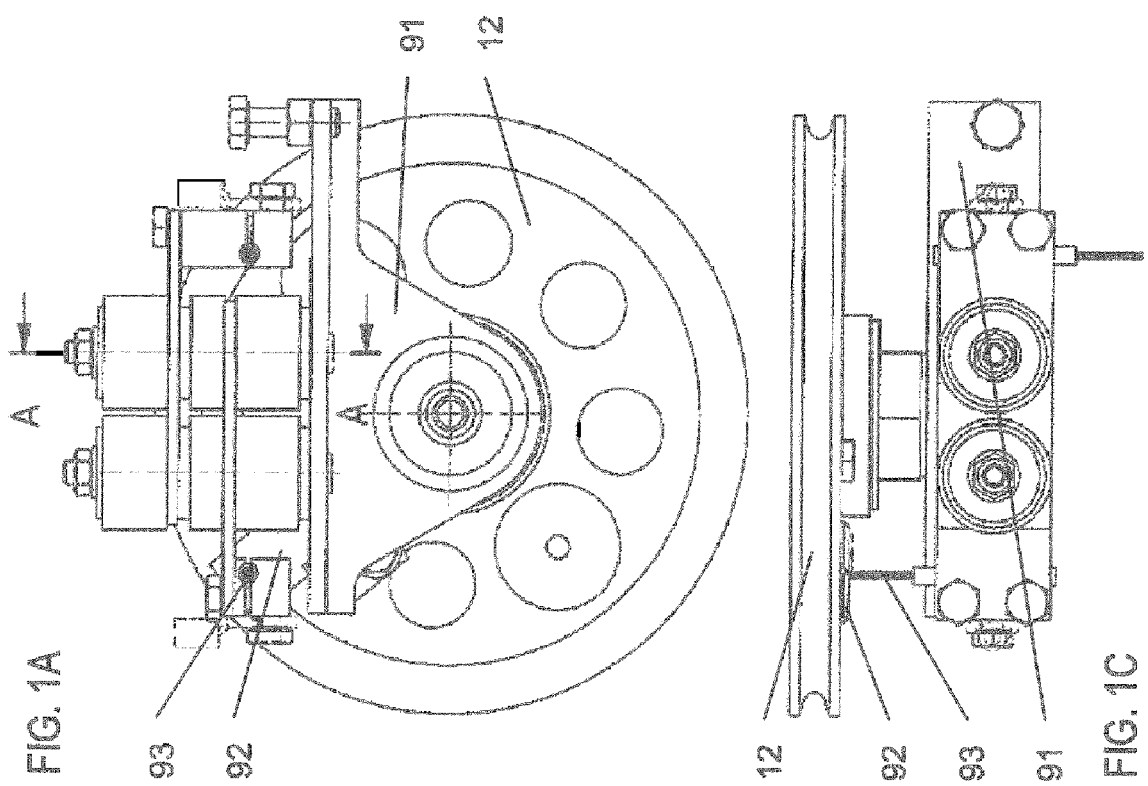

This application claims priority of German application No. 10 2007 032 009.6 filed on Jul. 9, 2007, the entire disclosure of which is hereby incorporated herein by reference.

BACKGROUND ART

A transport device with a monitoring device and a device for treatment of substrates with such a transport device is described below.

A conveyor belt is known from U.S. Pat. No. 2,472,526 A, in which a switch cam (cam 17) is provided in the shaft of the undriven feed roll for recognition of slowing or shutdown of the conveyor belt, and a three-way switch is arranged on this shaft, so that a circuit is closed in alternation by the switch cam, so that a capacitor (condensers 19, 20) is charged in alternation. The two capacitors feed a relay (relay 22) in alternation, which is held on this account, the discharge time of each capacitor being sufficient, in order to hold the relay in the holding position until the other capacitor is charged again and can supply the relay. Only if the conveyor belt moves more slowly than prescribed or even stops, because of unduly high load, is the discharge time of a capacitor no longer sufficient, in order to supply the relay long enough for the other capacitor to assume feed of the relay, so that the relay drops out and, as a result, a protection (relay 30) effectively connected to the relay interrupts power supply for the drive motor (electrical motor 15) of the conveyor belt. The proposed circuit arrangement is demanding and requires a number of electromechanical components that are prone to disturbance. In addition, the configuration of the three-way switch is chosen, so that friction between the contacts of the three-way switch (contact arm 16d) and the switch cam is as limited as possible, in order to reduce wear. This device is not suitable for recording or evaluating the electrical potential of the feed roll.

A transport device is known from AT 500 851 A4 for hot dip coating of metal strips, in which rotation of a deflection roll 4 arranged in the melting bath 3 is recognized by the fact that a permanent magnet 14 mounted on the deflection roll is passed by a fixed induction coil 15 during each revolution. The electrical potential of the feed roll cannot be either recorded or evaluated in this device either.

Consequently, there is a requirement for a transport device with a monitoring device that is suitable for recording and/or evaluation of the electrical potential of rotating components of the transport device. This task is solved by the transport device and the device for treatment of substrates of the present invention.

The described transport device is suitable for moving substrates through a vacuum coating unit, in order to coat them, etch them or treat them in vacuum some other way. Such vacuum coating units typically have lock chambers, as well as a vacuum chamber arranged between the lock chambers, which can be divided into compartments with different functions, for example, pump compartments and process compartments. The proposed transport device is naturally also suited for other installation types, in which substrates are passed by treatment devices, for example, continuous diffusion furnaces, etching devices, etc. The transport device is particularly suited for installations in which treatment of the substrates occurs at very high temperatures. The transport device is also readily suited for use in "dirty" surroundings, for example, during dry etching or vacuum coating, i.e., in methods, in which there is a hazard that the transport device will be undesirably coated with particles by deposition or condensation of particles.

BRIEF SUMMARY OF INVENTION

In a transport device that includes at least one endless conveyor guided by at least two deflection rolls, in which a monitoring device to monitor movement of the deflection roll is provided on at least one deflection roll, it is proposed that the monitoring device include a first contact element connected electrically conducting to the deflection roll and arranged on the deflection roll, as well as a second contact element arranged next to the deflection roll, the first and second contact elements being arranged relative to each other, so that during each revolution of the deflection roll, electrical contact occurs between the first contact element and the second contact element, so that the electrical potential of the deflection roll is transferred to the second contact element.

The transport device consequently includes at least one endless conveyor, i.e., a device that has an endless conveyor device guided by at least two deflection rolls. The conveyor device of the endless conveyor can be an endless cable, an endless belt with arbitrary cross-section (circle, trapezoid, etc.), an endless belt (belt with a flat rectangular cross-section) or an endless chain. For use in high temperature areas of a vacuum coating installation, the conveyor device can be designed as an endless stainless steel cable. An endless conveyor of the mentioned type can also include several conveyor devices, for example, two endless stainless steel cables guided over the same deflection rolls. Because of this, the stability of the endless conveyor can be increased, on the one hand, and its reliability improved, on the other, since the conveyor device is designed redundantly and the second conveyor device is always ready for operation on failure of one conveyor device.

In the embodiment of the transport device, it can be proposed that the first contact element be mounted on a side surface of the deflection roll, so that it describes a circular path during operation of the transport device.

As an alternative or in addition, it is proposed that the second contact element be arranged parallel to the axis of rotation of the deflection roll, so that by friction between the first contact element and the second contact element during each revolution of the deflection roll, undesired layers are removed from the first contact element.

In another embodiment of the transport device, it can be proposed that the first contact element be a spring steel sheet arranged on the deflection roll and/or that the second contact element be a flexible steel pin mounted in a holder electrically insulated from the deflection roll. The flexible steel pin can be a section of a stainless steel cable. It can also be proposed that the second contact element be electrically connected to an evaluation device to record the electrical potential of the deflection roll.

A device for treatment of substrates is also proposed, which includes at least one treatment device, as well as a transport device for transport of the substrates being treated to the treatment device, the transport device including at least one endless conveyor device guided by at least two deflection rolls, in which a monitoring device to monitor movement of the deflection roll is provided on at least one deflection roll, which includes a first contact element connected electrically conducting to the deflection roll, arranged on the deflection roll, and a second contact element arranged next to the deflection roll, the first and second contact elements being arranged relative to each other, so that during each revolution of the deflection roll, electrical contact occurs between the first contact element and the second contact element, so that the electrical potential of the deflection roll is transferred to the second contact element.

The transport device of this device for treatment of substrates corresponds to the aforementioned transport device. It goes without saying that the embodiments described in conjunction with the transport device can also be implemented in the device for treatment of substrates.

It can also be provided in the device for treatment of substrates that an evaluation device be provided to record the electrical potential of the deflection roll, which is electrically connected to the second contact element.

BRIEF DESCRIPTION OF THE DRAWING FIGURES

Figure 2:
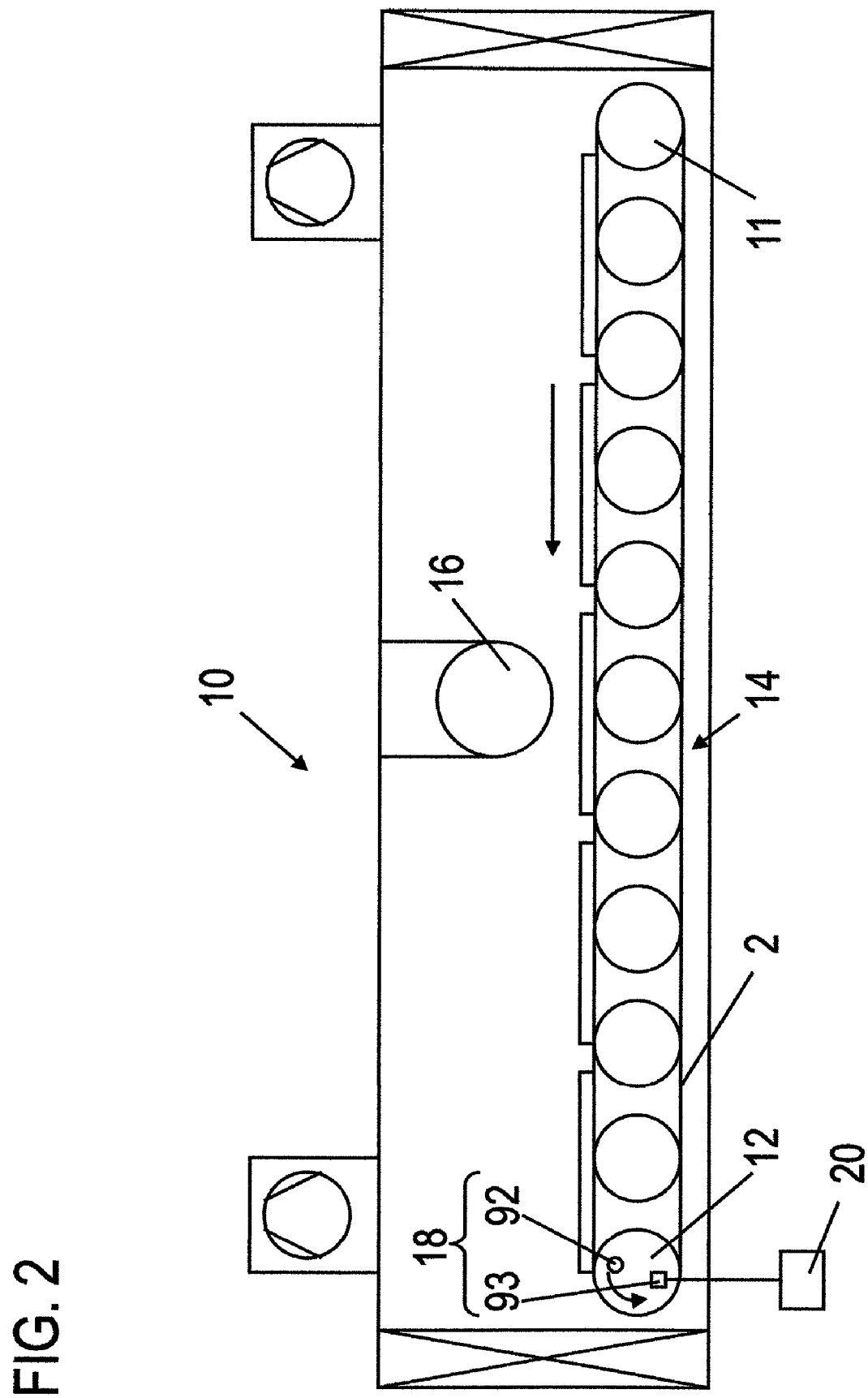

The described transport device is further explained below by means of practical examples and the corresponding drawings. In them, FIG. 1A is a side view, FIG. 1B is a partial vertical sectional view, FIG. 1C is a top view and FIG. 1D is a perspective view of a monitoring device of the described type for recognition of defects of an endless conveyor, and FIG. 2 illustrates an exemplary device for vacuum treatment of substrates.

DETAILED DESCRIPTION

As shown in FIGS. 1A-1D, a deflection roll 12 is mounted to rotate in a bearing block 91. The deflection roll 12 has a first contact element 92 on its side facing the bearing block 91, which, in the practical example, is a spring steel sheet mounted on the deflection roll. A second contact element 93 is mounted fixed on bearing block 91 electrically insulated from bearing block 91 and therefore from deflection roll 12. The second contact element 93 is designed as a flexible steel pin in the practical example. The flexibility is achieved by the fact that the steel pin 93 is a piece of stainless steel cable pressed into a holder.

If the endless conveyor is placed in operation, the deflection roll 12 begins to rotate. During each revolution, the spring steel sheet 92 passes by the flexible steel pin 93 once. Contact between the spring steel sheet 92 and the flexible steel pin 93 then occurs. In this way, the two contact elements 92; 93 form a simple mechanical switch, which closes a circuit during contact of contact elements 92; 93. If no switching process is recorded, despite the switched-on endless conveyor, this indicates that the deflection roll 12 is no longer rotating, from which it can be concluded that the conveyor device 2 of the endless conveyor is defective. The described monitoring device is robust, can withstand high ambient temperatures and is insensitive to possibly undesired coating of the contact elements 92; 93, since they automatically mutually clean each other during each revolution.

Because of the electrically-conducting connection between deflection roll 12 and the first contact element 92 and the electrical contact occurring during each revolution of the deflection roll 12 between the first contact element 92 and the second contact element 93, the electrical potential of the deflection roll 12 is transferred to the second contact element 93. If the second contact element 93 is connected to an evaluation device appropriate for this, the potential of the deflection roll 12 can be measured, on the one hand, and it can be recognized, on the other hand, that the transport device has stopped, which indicates a defect, for example, a torn conveyor device. In both cases, the required measures can quickly be taken, in order to readjust the desired parameters or repair the transport device.

FIG. 2 illustrates an exemplary device 10 for vacuum treatment of substrates including a transport device 14 for transport of substrates to a treatment device 16. The transport device includes at least one endless conveyor device 2 wrapped around at least two deflection rolls 11, 12. A monitoring device 18 is provided on at least one deflection roll 12 while an associated evaluation device 20 records electrical potential and monitors the movement of the deflection roll 12.

The invention claimed is:

1. Transport device, including at least two deflection rolls; at least one endless conveyor device wrapped around the at least two deflection rolls; and a monitoring device is provided on at least one deflection roll of said at least two deflection rolls to monitor movement of the deflection roll, the monitoring device including a first contact element connected physically and electrically conducting to the deflection roll and arranged on the deflection roll, as well as a second contact element arranged next to the deflection roll, the first and second contact elements being arranged relative to each other, so that during each revolution of the deflection roll, electrical contact occurs intermittently between the first contact element and the second contact element, so that electrical potential of the deflection roll is transferred to the second contact element to monitor movement of the deflection roll.

2. Transport device according to claim 1, wherein the first contact element is mounted on a side surface of the deflection roll, so that the first contact element describes a circular path during operation of the transport device.

3. Transport device according to claim 2, wherein the second contact element is arranged parallel to an axis of rotation of the deflection roll, so that by friction between the first contact element and the second contact element during each revolution of the deflection roll, undesired layers are removed from the first contact element.

4. Transport device according to claim 1, wherein the first contact element is a spring steel sheet arranged on the deflection roll.

5. Transport device according to claim 1, wherein the second contact element is a flexible steel pin mounted in a holder electrically insulated from the deflection roll.

6. Transport device according to claim 5, wherein the flexible steel pin is a section of a stainless steel cable.

7. Transport device according to claim 1, further including an evaluation device, wherein the evaluation device is electrically connected to the second contact element to record the electrical potential of the deflection roll and monitor the movement of the deflection roll.

8. Device for vacuum treatment of substrates, including at least one treatment device; a transport device for transport of the substrates being treated to the treatment device; wherein the transport device includes at least two deflection rolls; at least one endless conveyor device wrapped around the at least two deflection rolls; and a monitoring device provided on at least one deflection roll to monitor movement of the deflection roll, the monitoring device includes a first contact element connected physically and electrically conducting to the deflection roll and arranged on the deflection roll, as well as a second contact element arranged next to the deflection roll, the first and second contact elements being arranged relative to each other, so that during each revolution of the deflection roll, electrical contact occurs intermittently between the first contact element and the second contact element, so that electrical potential of the deflection roll is transferred to the second contact element to monitor movement of the deflection roll.

9. Device according to claim 8, further comprising an evaluation device to record the electrical potential of the deflection roll and monitor the movement of the deflection roll.

10. Device according to claim 8, wherein the treatment device comprises a vacuum coating or dry etching device.

11. Device according to claim 8, wherein the at least one endless conveyor device comprises at least one endless cable.

* * * * *